Dec. 29, 1936.  R. LABORDA  2,066,043
VEHICLE
Filed June 14, 1935   2 Sheets-Sheet 1
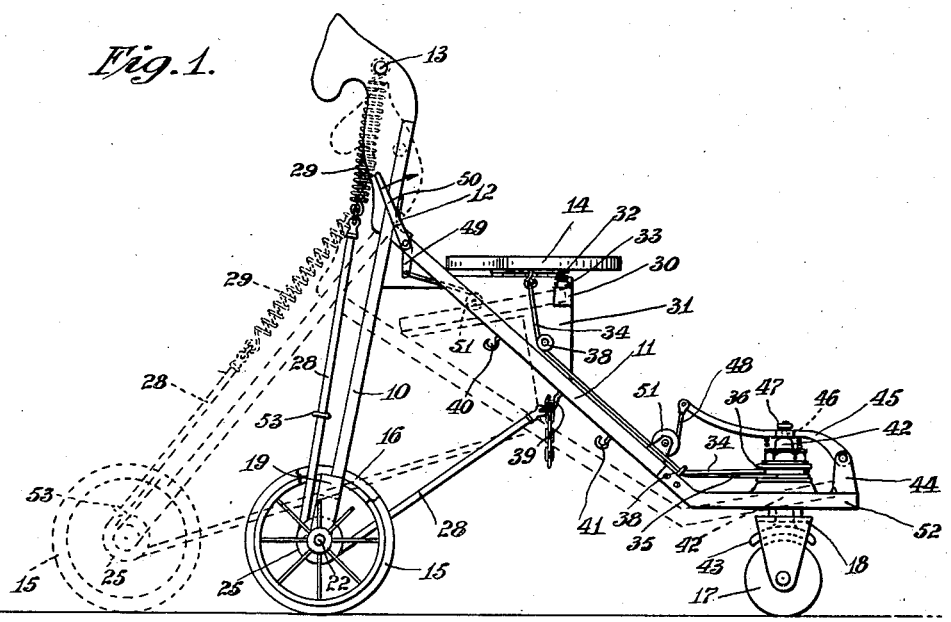
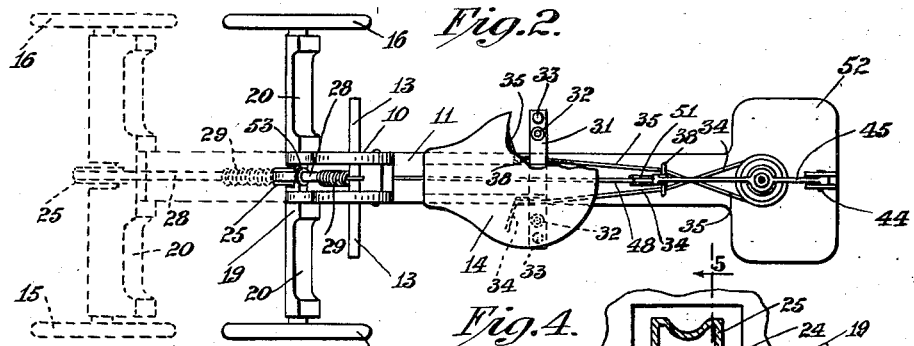
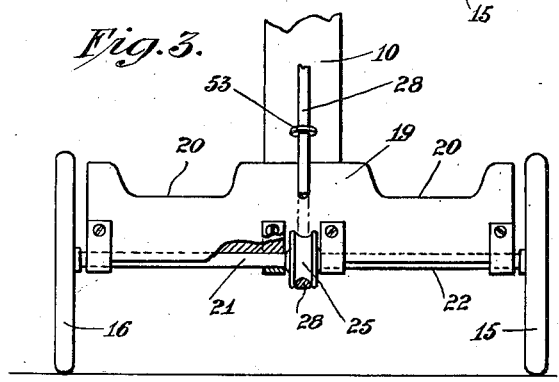
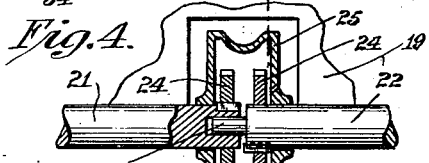
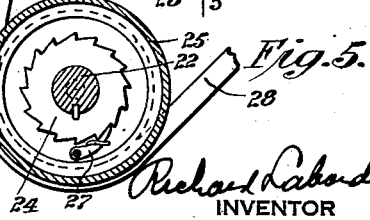

Dec. 29, 1936.  R. LABORDA  2,066,043
VEHICLE
Filed June 14, 1935  2 Sheets-Sheet 2
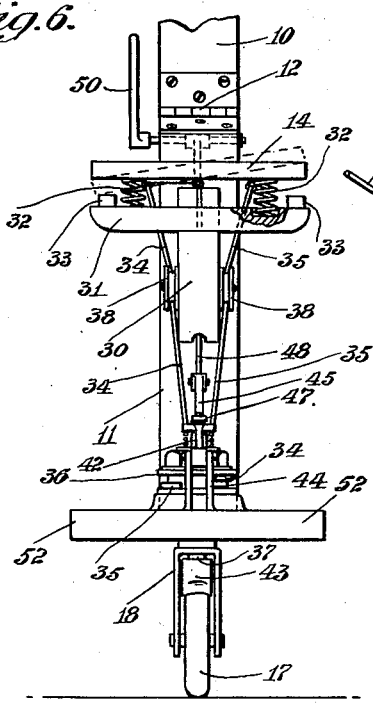
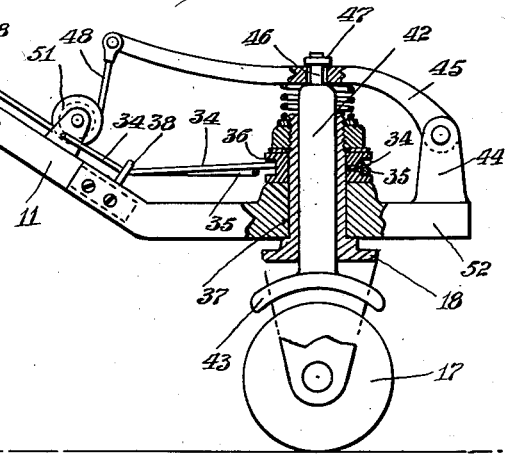
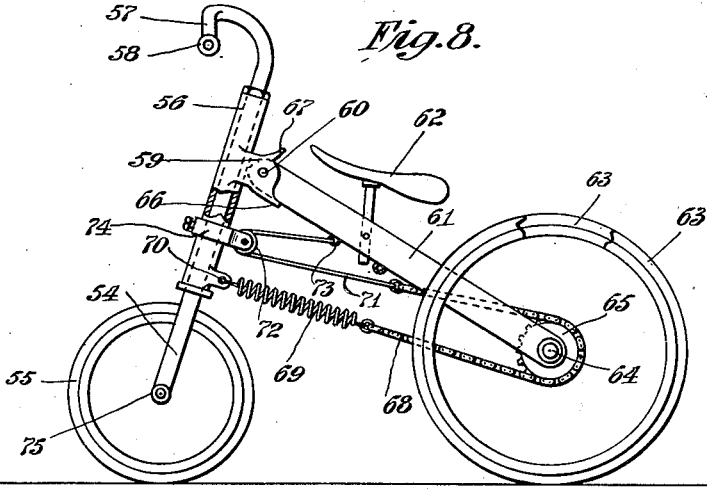
Richard Laborda
INVENTOR
ATTORNEY Patented Dec. 29, 1936

2,066,043

UNITED STATES PATENT OFFICE 2,066,043

VEHICLE

Richard Laborda, Brooklyn, N. Y.

Application June 14, 1935, Serial No. 26,543

17 Claims. (Cl. 208—38)

The invention relates to vehicles, and more particularly to a manually propelled vehicle in which the driving power is developed by the use of both the arms and the legs of the user.

A vehicle embodying the invention is primarily for use by children with the two-fold object of affording recreation and entertainment and developing and strengthening the back, arm and leg muscles of the user.

The construction of the vehicle is such that the power applied thereto through a driving mechanism, the actuation of which is against spring tension, will positively rotate, in one direction and by intermittent impulses, a driving wheel or wheels. The vehicle has movement not only during the application of power to the driving wheel or wheels through the driving mechanism, but during the following interval, during which the various parts are restored to their normal positions. This restoration of parts is in part by spring tension and in part by the application of manual power to those parts, the movement of which in one direction causes the actuation of said driving mechanism.

It is possible to control the speed of the vehicle, not only by variance in the manual power applied thereto but by adjusting the driving mechanism in a manner to control the operative effect of said mechanism throughout the duration of each impulse of the driving mechanism. This adjustment of the driving mechanism may also be employed to regulate the energy required for its actuation, thus adapting the physical exercise feature of the vehicle to the strength of the user and permitting increase of the resistance to the actuation of the driving mechanism, from time to time, as the muscular development of the user progresses.

In one embodiment of the invention, the direction of movement of the vehicle may be controlled by a steering wheel through a mechanism actuated by the shifting of the weight of the user from one side of the seat to the other side thereof.

The driving wheels are carried by a sectional shaft connected by differential gearing to facilitate the turning of the vehicle. The construction of the driving mechanism is such as to simultaneously apply power to both sections of the shaft through this differential gearing mechanism.

The frame of the vehicle includes a front and a rear member, the rear member being pivotally connected intermediate the ends of the front member in a manner to permit the spreading of the two members for the purpose of causing the development of the necessary driving power, and the restoration of these parts to a normal position in part through the action of a spring embodied in the driving mechanism which acts upon both of said members, and in part by the exertion of manual power to the front member.

The alternate separation and approach of the two frame members has the effect of alternately lowering and raising the seat of the vehicle, and the load of the user or the momentum resulting from such load upon the seat carried by the rear member assists in imparting power to said driving mechanism. In this manner the weight of the user is utilized to a limited extent in increasing the driving energy applied to the driving mechanism.

The construction is such that a simple form of brake member operative upon the steering wheel may be utilized, if desired, to control the speed of the vehicle. Such a mechanism, however, is not essential to the operation of the vehicle, particularly as the ground ordinarily is within reach of the feet of the user.

The invention consists primarily in a vehicle embodying therein a frame having front and rear members, means connecting said rear member intermediate the ends of said front member and permitting relative pivotal movement of said members about a horizontal axis, a handle bar adjacent the top, and footholds adjacent the bottom, of said front member and upon opposite sides of the means connecting said members, a driving wheel carried by one of said members, a steering wheel carried by the other of said members, a drum, a one-way clutch mechanism between said drum and said driving wheel, and a flexible member embodying therein an expansible section passing about and engaging said drum, the opposite ends of said flexible member being connected with said frame, whereby pivotal movement of said members in one direction imparts turning movement to said drum and said driving wheel and tensions said expansible section, and said wheel may continue to turn during a return pivotal movement of said members; and in such other novel features of construction and combination of parts as are hereinafter set forth and described, and more particularly pointed out in the claims hereto appended.

Referring to the drawings,

Fig. 1 is a side view of a vehicle embodying the invention having indicated in dotted lines the position of parts upon the application of power thereto;

Fig. 2 is a plan view of Fig. 1;

Fig. 3 is a front view partly broken away of the lower part of the front member of the vehicle;

Fig. 4 is a detailed view of the driving mechanism partly in section;

Fig. 5 is a section on the line 5—5 of Fig. 4;

Fig. 6 is a rear view of the vehicle with the upper portion of the front frame member broken away;

Fig. 7 is a side view partly in section of the steering wheel of the embodiment of the invention shown in Fig. 1; and Fig. 8 is a side view of a modified form of vehicle in which power is applied to the rear axle.

Like numerals refer to like parts throughout the several views.

In the embodiment of the invention shown in the drawings, the frame of the vehicle is composed of a front member 10 and a rear member 11. The member 11 is pivotally connected, as by an ordinary hinge 12, intermediate the top and bottom of the front member 10 and extends downwardly at an angle from said front member. The top of the front member 10 is provided with a handle bar 13, and the top of this member may take any desired form.

The rear member 11 of the frame has mounted thereon a seat 14, which seat, as will be hereinafter more fully explained, may be yieldably supported in relation to the member 11 so as to permit the control of the rear steering wheel by the lateral tilting of the seat by the shifting of the weight of the user.

Mounted in the lower end of the front member 10 is a sectional driving shaft carrying driving wheels 15 and 16, said shaft having driving power applied thereto and to the driving wheels by a driving mechanism which is made operative as a result of the separation or spreading of the members 10 and 11.

A rear steering wheel 17 mounted in a swiveling bracket 18 is carried by the lower end of the member 11. The relative diameters of the driving wheels 15 and 16 and the steering wheel 17 is immaterial to the invention, as is the detailed construction of these wheels. As shown in Fig. 1 of the drawings, the driving wheels 15 and 16 have spokes and an ordinary cushion tire, while the rear steering wheel 17 is a solid wheel which may be made of fairly hard vulcanized rubber molded to form. Any construction of wheel, however, may be used according to the price at which the article is to be marketed.

Secured to the front member 10 of the frame is a cross member 19 having on opposite sides thereof footholds 20 by means of which the lower part of the member 10 may be forced forwardly for the purpose of actuating a driving mechanism to develop driving power and apply such power to the wheels 15 and 16.

The sectional shaft carrying the wheels 15 and 16 consists of two parts 21 and 22, one of which 22 is rotatably mounted in a manner, shown at 23 in Fig. 4, in relation to the other member 21. Said shaft sections 21 and 22 are connected by a differential gearing consisting of ratchet gears 24 carried by the sections 21 and 22 respectively, a drum 25 idly mounted in relation to the said shaft sections, and pawls 26 and 27 carried by and movable with said drum and co-operating respectively with the ratchet gears 24. In the embodiment of the invention shown in Fig. 8, the drum 25 is provided with sprocket teeth.

A hollow drum 25 is used so as to permit the running of the ratchet gears 24 in oil or grease to eliminate as much as possible, noise in the operation of the gearing.

The differential gearing above referred to comprises a part of a driving mechanism propelling the vehicle. This mechanism also includes therein a flexible member, one end of which is connected with the front member 10, and the other end of which is connected with the rear member 11. This flexible member, in the form of the invention shown in Fig. 1, has a portion 28 formed of belting or other suitable material passing about and frictionally engaging the drum 25, and an expansible portion, preferably an expansion spring 29, which, in the form of the invention shown in Fig. 1, is in turn connected with the handle bar 13 and with one end of the belt section 28.

The ratchet gears 24 and the co-operating pawls 26 and 27 constitute a one-way clutch mechanism connecting the drum 25 with the sections 21 and 22 of the driving shaft and the driving wheels carried thereby. This is due to the fact that the pawls 26 and 27 are carried and turn with the drum 25 or its equivalent, and are spring pressed into engagement with their co-operating ratchet wheels so that while said gears necessarily are turned as the drum is turned in one direction, when the drum is turned in the opposite direction said pawls ride upon the teeth of the ratchet gears. Also, either ratchet gear may turn independently of the drum at all times. Other forms of one-way clutch mechanisms may be used if desired, but that shown in the drawings and described is satisfactorily operative and may be cheaply produced.

The seat 14 is tiltingly mounted upon a bracket 30 carrying a cross bar 31 and is normally held in a horizontal plane by the springs 32. Stops 33 upon opposite sides of the cross bar 31 limit the angular movement of the seat 14 as shown in dotted lines in Fig. 6. With this construction, the seat 14 may be laterally tilted at will.

Secured to the opposite sides of the seat 14 in any desired manner are tiller cords 34 and 35, and these tiller cords extend to and are connected to a sheave or other radius device 36 carried by the pivot 37 of the bracket 18, said cords being crossed in their run from the seat 14 to the sheave 36 so that with the tilting of said seat in one direction, the steering wheel 17 will be turned in the opposite direction. The cords 34 and 35 pass about suitable guides 38 carried by the rear member 11 of the frame, which is made necessary because of the angularity of said member 11 and the resulting changes in course of the tiller cords in their run from the seat to the sheave 36.

To permit the control of the speed developed by the vehicle with each actuation of the driving mechanism, I provide the under side of the rear member 11 of the frame with a plurality of means 39, 40 and 41 with which the flexible member 28 of the driving mechanism may be selectively connected, it being understood that the length of said member should be varied according to which of said connecting means is used. These connecting means 39, 40 and 41 are spaced at different distances radially of the pivotal connection 12 between the members 10 and 11. By connecting the end of the flexible member 28 closer to the axis of the pivot 12, the speed of the vehicle, or its quantity of movement with each actuation of the driving mechanism, is reduced, and with the point of connection at a great distance radially or substantially radially of said axis, the speed or quantity of movement is increased.

Each actuation of the driving mechanism is accompanied by a tensioning of the spring 29, and the amount of energy required in tensioning the spring becomes progressively greater with the speed or quantity of travel of the vehicle with each actuation of the driving mechanism. Consequently, by varying the location of the point of connection of the belt 28 with the member 11, it is not only possible to vary the speed of the vehicle in the manner above described, but to vary the power required to operate the vehicle.

In some styles of vehicles the provision of a brake may be desirable, and I have therefore shown, in the drawings, in connection with the form of the invention shown in Figs. 1 to 7, a manually operative brake mechanism which is inexpensive to produce.

In the form of this brake mechanism shown, I use a hollow pivot 37 within which a brake pin 42 is slidably mounted. Carried by this pin is a brake shoe 43 adapted to engage the top of the steering wheel 17. The arms of the bracket 18 prevent turning of the brake pin 42 and compel turning movement of the brake shoe with the steering wheel.

Carried by the member 11 is a fitting 44 in which is pivoted a brake lever 45, bearing intermediate its ends upon the top of the brake pin 42. To prevent possibility of disarrangement of the brake lever and the brake pin, the end of said brake pin may be reduced, as shown at 46, this reduced end passing through an opening in the brake lever 45 and being held against displacement by a nut 47 screw threaded upon said extension 46. The nut 47 is spaced from the top of the brake pin a sufficient distance, and the opening through which the reduced extension 46 passes is of a diameter sufficiently great to compensate for the arcuate movement of the brake lever 45.

Connected with one end of the arm 45 is a flexible brake cord 48 which extends to one arm 49 of a bell crank lever which carries an operating handle 50 conveniently accessible from the seat 14. The brake cord 48 passes about suitable guides 51 carried by the member 11.

The guides 38 and 51 are used solely for the purpose of keeping the tiller cords and the brake cord close to the member 11 where they will not be in the way of the user of the vehicle.

In the form of the invention shown in Figs. 1 to 7, the lower end of the rear frame member may be provided with laterally projected steps 52 upon which the user may stand, if desired, and operate the vehicle while thus standing. With small vehicles, however, such steps are unnecessary and, in some instances, are undesirable.

While the increased tension of the expansible section or spring 29, during the actuation of the driving mechanism, may be relied upon to limit the separation or spreading of the front member 10 and the rear member 11, a positive stop 53 may be applied to the belt section 28 which, by contact with the drum 25, will positively limit the extent of forward movement of the front member 10.

Heretofore, the form of the invention shown in Figs. 1 to 7 has been referred to. The modification shown in Fig. 8 will now be described.

In this form of the invention, the general construction and mode of operation is the same as in the other form illustrated, with the exception that the power of the driving mechanism is applied to rear driving wheels instead of to front driving wheels, and the steering is done as in an ordinary bicycle with the front wheel. The brake mechanism is also omitted from the showing of Fig. 8. This application of driving power to the rear wheels instead of to the front wheels involves a different arrangement of the parts of the driving mechanism.

Referring more particularly to Fig. 8 of the drawings, the frame consists of a front wheel fork 54 having mounted therein a wheel 55. The fork 54 is mounted in an ordinary steering head 56. Carried by the fork 54 is an ordinary steering handle 57 having hand grips 58. The steering head 56 has a rearwardly directed forked member 59 in which is pivotally mounted at 60, so as to have movement about a horizontal axis, a downwardly declining rear frame member 61. Mounted upon said member 61 is an ordinary seat 62.

As shown in the drawings, two rear driving wheels 63 are used, these wheels being mounted upon a sectional driving shaft 64 of the same construction as that heretofore described, the sections of said shaft receiving power through a differential gearing 65 embodying therein a drum and a one-way clutch mechanism as heretofore described.

To limit the relative pivotal movement of the front member or steering head 56 and the rear member 61, I provide the forked member 59 with stop members 66 and 67 engageable with opposite faces of the rear frame member 61.

The driving mechanism consists of a flexible member having a portion 68 in the form of a sprocket chain engaging sprocket teeth about the drum 65 of the differential gearing. One end of this sprocket chain is connected with an expansion spring 69, which in turn is connected with a lug 70 upon the steering head 56. The other end of the chain is connected with a flexible cord 71 passing about a pulley 72 and connected at 73 with the rear member 61.

The pulley 72 is carried by a clamp collar 74 which may be adjusted vertically of the steering head 56 to so control the application of power to the driving wheels as to permit variance in the speed of the vehicle with the maximum separation of the two frame members, or of the amount of energy required in so separating or spreading these members. By using a pulley system of the second class as described, it is possible to attain higher speeds than though both ends of the flexible member were connected to the steering head 56. If higher speed of the vehicle or the exertion of less strength in operating same is required, the pulley 72 may be dispensed with and the end of the cord 71 connected directly with the clamp collar 74.

By raising the collar 74, the speed of the vehicle, with a given separation or spreading of the two frame members and the energy required to thus separate or spread said members may be reduced. By lowering the clamp collar 74, the speed of the vehicle and the energy required may be increased.

The front fork 54 is provided with laterally extending footrests 75 corresponding in function with the footrests 20 of the form of the invention shown in Figs. 1 to 7.

The operation of the herein described vehicle is substantially as follows:—

In both forms shown, the user sits upon the seat 14 or 62, grasps the handholds 13 or 58 and places both feet at an angle upon the footrests 20 or 75. The spring 29 or 69 will offer sufficient resistance to the spreading of the front and rear members of the frame to prevent actuation of the driving mechanism by the weight of the user alone.

When it is desired to propel the vehicle, the user pulls backwardly upon the handholds 13 or 58 and pushes forwardly upon the footrests 20 and 75, thus oscillating the front member 10 or 56 about the pivot 12 or 60. Since this front member is pivotally connected intermediate its ends with the forward end of the back member 11 or 61, with the greater leverage adjacent said footrests this oscillation, backed by the energy of the muscles of the legs, arms and back, will force the drum 25 forwardly along the belt 28 or, in the form of the invention shown in Fig. 8, force the drum rearwardly along the upper reach of the chain 68. In each instance the result will be the actuation of the differential gearing in a manner to move the vehicle forwardly.

The pivotal movement of the two frame members will pay out the flexible member of the actuating means for the driving mechanism with the rotation of the drum, and will incidentally tension the expansible portion of this flexible member. The quantity of the lineal movement of the flexible member controls the extent of rotation of the drum and of the driving wheel, and by controlling this action of the flexible member, the speed of the vehicle and the resistance to the actuation of the frame members may be controlled. The extent of movement of the vehicle with each impulse imparted thereto by the driving mechanism is therefore controlled by the arrangement of the flexible member of the driving mechanism rather than by the extent of separation of the two members. This, however, is a setting of the parts of the vehicle, and if the user spreads the two members of the frame to an extent below that possible, the length of the driving impulse and the speed of the vehicle will be reduced in proportion to the variation of the quantity of said spreading movement.

The spring 29 or 69 will be tensioned by this forward movement of the front member, and the maximum tension attained will be determined by the quantity of spreading movement of the two frame members.

After the completion of the full stroke of the front member, the user pushes forwardly upon the handholds or grips 13 or 58, the tendency of the spring to retract aiding in the return movement of this member and the resultant elevation and forward movement of the rear member. This operation may be repeated at any desired speed, and by reason of the one-way clutch connection between the drum 25 or 65 and the sectional driving shaft, the vehicle will advance in a sequence of forward impulses, the seat falling with each forward impulse and rising during the return of the two frame members to their normal position.

While the strength of the spring 29 or 69 is a controlling factor in determining the desired strength required to propel the vehicle, the effective action of said spring may be changed by adjustment of the flexible member of the driving mechanism.

Referring to the embodiment of the invention shown in Figs. 1 to 7, by connecting the flexible portion 28 with the means of attachment 40 with the rear frame member, the run of the drum in relation to said flexible portion 28 will be less than though this portion is connected with the attachment means 40. The run of the pulley along the portion 28 will be greater, however, if the end of this portion be secured to the attachment means 41. With a greater run of the drum, greater tension will be developed in the spring 29, and with a lesser run of the drum the tension developed in said spring will be relatively less. This is due to the fact that if the portion 28 of the flexible member is attached close to the axis of pivotal movement of the front member 10, it will have a swinging movement with the lower portion of said member.

The greater the radial distance of the point of connection of the end of this portion 28 with the rear member 11, the less will be this movement, and consequently the greater will be the coincident movement of said portion and of the drum. For example, if the portion 28 of the flexible member were extended along a substantially horizontal line, it would have no movement with the front frame member 10, and since this front member has a fixed or predetermined forward movement, the entire movement thereof would be utilized in turning the driving wheels. Furthermore, with this setting of the portion 28, the spring 29 would be tensioned to its maximum extent upon the limit of the forward movement of the front frame member.

While, in the form of the invention shown in Fig. 8, the portion 71 of the flexible part of the actuating member for the driving mechanism might be connected directly with the front frame member, by using a pulley 72 I am enabled, with the same quantity of movement of said front frame member, to secure a greater speed of the vehicle, because with this arrangement the length of movement of said portion against the tension of the spring 69 is increased.

In this form of the invention, by raising the clamp collar 74, the extent of the taking up of the flexible member is reduced, while by lowering said clamp member it is increased.

The mode of operation of the brake mechanism is obvious.

Referring to the form of the invention shown in Figs. 1 to 7, to steer the vehicle, it is merely necessary for the user to lean in the direction in which he desires to go. This shifting of his weight from one side of the seat to the other tilts the seat, and this movement of the seat exerts a pull upon one tiller cord as 35 and pays out the other tiller cord 34, the crossing of these cords resulting in their acting upon the sheave or other radius member 36 at the side of the vehicle opposite in direction to the movement of the body of the user. For example, as indicated in dotted lines Fig. 6, if the user leans to the left, the steering wheel 17 will be turned to the right.

In the embodiment of the invention shown in Fig. 8, the steering is done as in an ordinary scooter, velocipede or bicycle, by means of a handle bar 57.

The materials used in the construction of the vehicle are immaterial to the invention. The manner of assembling the parts, however, is such as to permit the convenient separation and assembly of these parts so as to permit the delivery of the article in knock-down form, if desired.

The driving mechanism shown in Fig. 8 is merely a reversal of the driving mechanism shown in the other form of the invention to the mechanism is taken up with the separation or extent that the flexible member of the driving spreading of the two frame members against the tension of the spring 69, while in the other form said flexible member is paid out against the tension of the spring 29. In both cases the spring is tensioned during the impulse imparted to the driving wheel or wheels, and is retracted upon the restoration to normal of the two pivotally connected frame members.

With the driving mechanism described, the driving wheels receive a positive impulse with the separation of the two frame members, and by reason of the one-way clutch connection between the driving mechanism and the driving wheels, said wheels are permitted to roll during the return of the two frame members to normal.

In Fig. 8 of the drawings I have shown the use of two driving wheels, but it is obvious that only one such wheel may be employed, a construction which would necessitate merely the omission of one ratchet gear, one shaft section and one pawl cooperating with said ratchet gear.

The stop 53 or the stop 67 places a limit upon the maximum spreading movement of the two frame members.

It is not my intention to limit the invention to the precise details of construction shown in the accompanying drawings, it being obvious that such may be varied without departing from the spirit and scope of the invention.

Having described the invention, what I claim as new and desire to have protected by Letters Patent, is:—

1. A vehicle embodying therein a frame having front and rear members, means connecting said rear member intermediate the ends of said front member and permitting relative pivotal movement of said members about a horizontal axis, a handle bar adjacent the top, and footholds adjacent the bottom, of said front member and upon opposite sides of the means connecting said members, a driving wheel carried by one of said members, a steering wheel carried by the other of said members, a drum, a one-way clutch mechanism between said drum and said driving wheel, and a flexible member embodying therein an expansible section passing about and engaging said drum, the opposite ends of said flexible member being connected with said frame, whereby pivotal movement of said members in one direction imparts turning movement to said drum and said driving wheel and tensions said expansible section, and said wheel may continue to turn during a return pivotal movement of said members.

2. A vehicle embodying therein a frame having front and rear members, means connecting said rear member intermediate the ends of said front member and permitting relative pivotal movement of said members about a horizontal axis, a handle bar adjacent the top, and footholds adjacent the bottom, of said front member and upon opposite sides of the means connecting said members, a driving wheel carried by one of said members, a steering wheel carried by the other of said members, a drum, a one-way clutch mechanism between said drum and said driving wheel, and a flexible member embodying therein an expansible section passing about and engaging said drum, one end of said flexible member being connected with said front frame member, and the other end thereof being connected with said rear frame member, whereby pivotal movement of said members in one direction imparts turning movement to said drum and said driving wheel and tensions said expansible section, and said wheel may continue to turn during a return pivotal movement of said members.

3. A vehicle embodying therein a frame having front and rear members, means connecting and permitting relative pivotal movement of said members about a horizontal axis, a driving shaft mounted in one of said members, a driving wheel carried thereby, a ratchet gear carried by said shaft, a drum idly mounted upon said shaft, a pawl carried by said drum operative upon said ratchet gear, a steering wheel carried by the other of said members, and a flexible member embodying therein an expansible section passing about and engaging said drum, the opposite ends of said flexible member being connected with said frame, whereby pivotal movement of said members in one direction imparts turning movement to said drum and said driving wheel and tensions said expansible section, and said wheel may continue to turn during a return pivotal movement of said members.

4. A vehicle embodying therein a frame having front and rear members, means connecting and permitting relative pivotal movement of said members about a horizontal axis, a driving shaft mounted in one of said members, a driving wheel carried thereby, a ratchet gear carried by said shaft, a drum idly mounted upon said shaft, a pawl carried by said drum operative upon said ratchet gear, a steering wheel carried by the other of said members, and a flexible member embodying therein an expansible section passing about and engaging said drum, one end of said flexible member being connected with said front frame member, and the other end thereof being connected with said rear frame member, whereby pivotal movement of said members in one direction imparts turning movement to said drum and said driving wheel and tensions said expansible section, and said wheel may continue to turn during a return pivotal movement of said members.

5. A vehicle embodying therein a frame having front and rear members, means connecting said rear frame member to said front frame member intermediate the ends thereof and permitting relative pivotal movement of said members about a horizontal axis, hand grips adjacent one end, and footrests adjacent the other end, of said front frame member, a driving wheel carried by one of said members, a steering wheel carried by the other of said members, a drum, a one-way clutch mechanism between said drum and said driving wheel, and a flexible member embodying therein an expansible section passing about and engaging said drum, the opposite ends of said flexible member being connected with said frame, whereby pivotal movement of said members in one direction imparts turning movement to said drum and said driving wheel and tensions said expansible section, and said wheel may continue to turn during a return pivotal movement of said members.

6. A vehicle embodying therein a frame having front and rear members, means connecting said rear frame member to said front frame member intermediate the ends thereof and permitting relative pivotal movement of said members about a horizontal axis, hand grips adjacent one end, and footrests adjacent the other end, of said front frame member, a driving shaft mounted in one of said members, a driving wheel carried thereby, a ratchet gear carried by said shaft, a drum idly mounted upon said shaft, a pawl carried by said drum operative upon said ratchet gear, a steering wheel carried by the other of said members, and a flexible member embodying therein an expansible section passing about and engaging said drum, the opposite ends of said flexible member being connected with said frame, whereby pivotal movement of said members in one direction imparts turning movement to said drum and said driving wheel and tensions said expansible section, and said wheel may continue to turn during a return pivotal movement of said members.

7. A vehicle embodying therein a frame having front and rear members, means connecting and permitting relative pivotal movement of said members about a horizontal axis, means limiting the relative pivotal movement of said frame members, a driving wheel carried by one of said members, a steering wheel carried by the other of said members, a drum, a one-way clutch mechanism between said drum and said driving wheel, and a flexible member embodying therein an expansible section passing about and engaging said drum, the opposite ends of said flexible member being connected with said frame, whereby pivotal movement of said members in one direction imparts turning movement to said drum and said driving wheel and tensions said expansible section, and said wheel may continue to turn during a return pivotal movement of said members.

8. A vehicle embodying therein a frame having front and rear members, means connecting and permitting relative pivotal movement of said members about a horizontal axis, a driving wheel carried by one of said members, a steering wheel carried by the other of said members, a drum, a one-way clutch mechanism between said drum and said driving wheel, a flexible member embodying therein an expansible section passing about and engaging said drum, the opposite ends of said flexible member being connected with said frame, whereby pivotal movement of said members in one direction imparts turning movement to said drum and said driving wheel and tensions said expansible section, and said wheel may continue to turn during a return pivotal movement of said members, and means whereby the point of connection of said flexible member with one of said frame members may be adjusted substantially radially toward and from the pivotal connection between said members to control the operative effect of said flexible member upon said driving wheel and the extent of the tension developed in the expansible section of said flexible member.

9. A vehicle embodying therein a frame having front and rear members, means connecting and permitting relative pivotal movement of said members about a horizontal axis, a driving wheel carried by one of said members, a steering wheel carried by the other of said members, a seat mounted to have lateral tilting movement upon said rear frame member, a radius member carried by said steering wheel, connections between opposite sides of said seat and opposite sides of said radius member, whereby the tilting of said seat will actuate said steering wheel, a drum, a one-way clutch mechanism between said drum and said driving wheel, and a flexible member embodying therein an expansible section passing about and engaging said drum, the opposite ends of said flexible member being connected with said frame, whereby pivotal movement of said members in one direction imparts turning movement to said drum and said driving wheel and tensions said expansible section, and said wheel may continue to turn during a return pivotal movement of said members.

10. A vehicle embodying therein a frame having front and rear members, means connecting said rear frame member to said front frame member intermediate the ends thereof and permitting relative pivotal movement of said members about a horizontal axis, hand grips adjacent one end, and footrests adjacent the other end, of said front frame member, a driving wheel carried by one of said members, a bracket having a hollow pivot mounted in said rear frame member, a steering wheel mounted therein, means for actuating said steering wheel, a brake pin slidably mounted in said pivot, a brake shoe carried thereby in engageable relation with said steering wheel, a fitting carried by said rear frame member, a brake lever engageable with said brake pin mounted therein, a hand lever adjacent said front fitting, a connection between said hand lever and said brake lever, means guiding said connection, a drum, a one-way clutch mechanism between said drum and said driving wheel, and a flexible member embodying therein an expansible section passing about and engaging said drum, the opposite ends of said flexible member being connected with said frame, whereby pivotal movement of said members in one direction imparts turning movement to said drum and said driving wheel and tensions said expansible section, and said wheel may continue to turn during a return pivotal movement of said members.

11. A vehicle embodying therein a frame having front and rear members, means connecting said rear frame member to said front frame member intermediate the ends thereof and permitting relative pivotal movement of said members about a horizontal axis, hand grips adjacent one end, and footrests adjacent the other end, of said front frame member, a driving wheel carried by one of said members, a steering wheel carried by the other of said members, a drum, a one-way clutch mechanism between said drum and said driving wheel, and a flexible member embodying therein an expansion spring connected with said front frame member adjacent the top thereof, and a non-expansible portion connected with said spring and passing, with a portion thereof substantially parallel with said front frame member, about said drum, the end of said non-expansible member being connected with said rear frame member adjacent the ends thereof, whereby pivotal movement of said members in one direction imparts turning movement to said drum and said driving wheel and tensions said expansion spring, and said wheel may continue to turn during a return pivotal movement of said members.

12. A vehicle embodying therein a frame having front and rear members, means connecting said rear frame member to said front frame member intermediate the ends thereof and permitting relative pivotal movement of said members about a horizontal axis, hand grips adjacent one end, and footrests adjacent the other end, of said front frame member, a driving shaft mounted in one of said members, a driving wheel carried thereby, a ratchet gear carried by said shaft, a drum idly mounted upon said shaft, a pawl carried by said drum operative upon said ratchet gear, a steering wheel carried by the other of said members, a drum, a one-way clutch mechanism between said drum and said driving wheel, and a flexible member embodying therein an expansion spring connected with said front frame member adjacent the top thereof, and a non-expansible portion connected with said spring and passing, with a portion thereof substantially parallel with said front frame member, about said drum, the end of said non-expansible member being connected with said rear frame member adjacent the ends thereof, whereby pivotal movement of said members in one direction imparts turning movement to said drum and said driving wheel and tensions said expansion spring, and said wheel may continue to turn during a return pivotal movement of said members.

13. A vehicle embodying therein a frame having front and rear members, means connecting said rear frame member to said front frame member intermediate the ends thereof and permitting relative pivotal movement of said members about a horizontal axis, hand grips adjacent one end, and footrests adjacent the other end, of said front frame member, a driving shaft mounted in one of said members, a driving wheel carried thereby, a ratchet gear carried by said shaft, a drum idly mounted upon said shaft, a pawl carried by said drum operative upon said ratchet gear, a steering wheel carried by the other of said members, a seat mounted to have lateral tilting movement upon said rear frame member, a radius member carried by said steering wheel, connections between opposite sides of said seat and opposite sides of said radius member, whereby the tilting of said seat will actuate said steering wheel, a drum, a one-way clutch mechanism between said drum and said driving wheel, and a flexible member embodying therein an expansion spring connected with said front frame member adjacent the top thereof, and a non-expansible portion connected with said spring and passing, with a portion thereof substantially parallel with said front frame member, about said drum, the end of said non-expansible member being connected with said rear frame member adjacent the ends thereof, whereby pivotal movement of said members in one direction imparts turning movement to said drum and said driving wheel and tensions said expansion spring, and said wheel may continue to turn during a return pivotal movement of said members.

14. A vehicle embodying therein a frame having front and rear members, means connecting said rear frame member to said front frame member intermediate the ends thereof and permitting relative pivotal movement of said members about a horzontal axis, hand grips adjacent one end, and footrests adjacent the other end, of said front frame member, a sectional driving shaft mounted in said front frame member, a driving wheel carried by each section of said shaft, a ratchet gear carried by each section of said shaft, a drum idly mounted upon both sections of said shaft and inclosing said ratchet gears, pawls carried by said drum operative upon said ratchet gears respectively, a steering wheel carried by the other of said members, and a flexible member embodying therein an expansible section passing about and engaging said drum, the opposite ends of said flexible member being connected with said frame, whereby pivotal movement of said members in one direction imparts turning movement to said drum and said driving wheels and tensions said expansible section, and said wheels may continue to turn during a return pivotal movement of said members.

15. A vehicle embodying therein a frame having a front member consisting of a steering head, and a rear member, means connecting said rear frame member to said front frame member intermediate the ends thereof and permitting relative pivotal movement of said members about a horizontal axis, a forked member mounted in said steering head having a handle bar adjacent one end thereof, a steering wheel mounted in the forked other end thereof, a seat carried by said rear frame member, a driving wheel carried by said rear frame member, a drum, a one-way clutch mechanism between said drum and said driving wheel, and a flexible member embodying therein an expansible section passing about and engaging said drum, the opposite ends of said flexible member being connected with said frame, whereby pivotal movement of said members in one direction imparts turning movement to said drum and said driving wheel and tensions said expansible section, and said wheel may continue to turn during a return pivotal movement of said members.

16. A vehicle embodying therein a frame having a front member consisting of a steering head, and a rear member, means connecting said rear frame member to said front frame member intermediate the ends thereof and permitting relative pivotal movement of said members about a horizontal axis, a forked member mounted in said steering head having a handle bar adjacent one end thereof, a steering wheel mounted in the forked other end thereof, a seat carried by said rear frame member, a driving wheel carried by said rear frame member, a drum, a one-way clutch mechanism between said drum and said driving wheel, and a flexible member embodying therein an expansible section passing about and engaging said drum, one end of said flexible member being connected with said steering head, and the other end thereof passing about a pulley carried by said steering head and being connected with said rear frame member, whereby pivotal movement of said members in one direction imparts turning movement to said drum and said driving wheel and tensions said expansible section, and said wheel may continue to turn during a return pivotal movement of said members.

17. A vehicle embodying therein a frame having a front member consisting of a steering head, and a rear member, means connecting said rear frame member to said front frame member intermediate the ends thereof and permitting relative pivotal movement of said members about a horizontal axis, a forked member mounted in said steering head having a handle bar adjacent one end thereof, a steering wheel mounted in the forked other end thereof, a seat carried by said rear frame member, a driving wheel carried by said rear frame member, a drum, a one-way clutch mechanism between said drum and said driving wheel, a clamp collar adjustably mounted upon said steering head, a pulley carried thereby, and a flexible member embodying therein an expansible section passing about and engaging said drum, one end of said flexible member being connected with said steering head, and the other end thereof passing about said pulley and being connected with said rear frame member, whereby pivotal movement of said members in one direction imparts turning movement to said drum and said driving wheel and tensions said expansible section, said wheel may continue to turn during a return pivotal movement of said members, and the speed of travel of the vehicle and the extent of the tensioning of said expansible member may be varied by adjusting said clamp collar vertically of said steering head.

RICHARD LABORDA.